United States Patent [19]

MacDonald

[11] Patent Number: 5,288,003
[45] Date of Patent: Feb. 22, 1994

[54] FLEXIBLE, CAR-TOP-TRANSPORTABLE CARRIER FOR AERODYNAMICALLY STREAMLINED CARS

[76] Inventor: Ron E. MacDonald, 823 E. Hayward Ave., Phoenix, Ariz. 85020

[21] Appl. No.: 920,138

[22] Filed: Jul. 24, 1992

[51] Int. Cl.$^5$ .................................. B60R 9/055
[52] U.S. Cl. .................... 224/328; 224/329; 224/318; 224/311; 224/319; 383/66; 28/143
[58] Field of Search ............. 224/309, 311, 314, 316, 224/318, 319, 324–331, 42.42; 28/140, 143; 383/66, 105, 107, 123, 124

[56] References Cited

U.S. PATENT DOCUMENTS

| | | | |
|---|---|---|---|
| 2,105,989 | 1/1938 | Rush | 224/318 |
| 2,268,881 | 1/1942 | Le Boeuf | 224/318 |
| 2,621,836 | 12/1952 | McMiller | 224/328 |
| 3,000,418 | 9/1961 | Bitting | 224/328 X |
| 4,050,614 | 9/1977 | Simpson | 224/328 |

FOREIGN PATENT DOCUMENTS

| | | | |
|---|---|---|---|
| 0045530 | 6/1935 | France | 224/329 |
| 0045694 | 8/1935 | France | 224/331 |
| 1147612 | 11/1957 | France | 224/328 |
| 8301603 | 5/1983 | PCT Int'l Appl. | 224/329 |
| 0216092 | 11/1941 | Switzerland | 224/331 |
| 0313344 | 6/1929 | United Kingdom | 224/328 |
| 0724687 | 2/1955 | United Kingdom | 224/328 |
| 0762177 | 11/1956 | United Kingdom | 224/328 |
| 0816323 | 7/1959 | United Kingdom | 224/311 |

Primary Examiner—J. Casimer Jacyna
Attorney, Agent, or Firm—James F. Duffy

[57] ABSTRACT

A car-top-transportable baggage carrier is particularly suited for use on aerodynamically streamlined cars which have no rain gutters. The carrier is made from a single continuous piece of material so that no seams or joinings in the material are produced in the face of the enclosure or the top and bottom surfaces. Weight distribution paneling within a load bearing floor pad inserted at the bottom of the carrier serve to distribute the weight of articles emplaced within the carrier, yet permit the carrier to be accordion folded for storage when not in use. Straps affixed to the top of the carrier are employed to secure the carrier in position on top of an automobile. The straps are equipped with innovative door head liner hooks which secure the carrier to the interior of the automobile adjacent the top of the car door. Releasable couplings permit rapid removal and replacement of the distal ends of the strapping as desired.

14 Claims, 4 Drawing Sheets

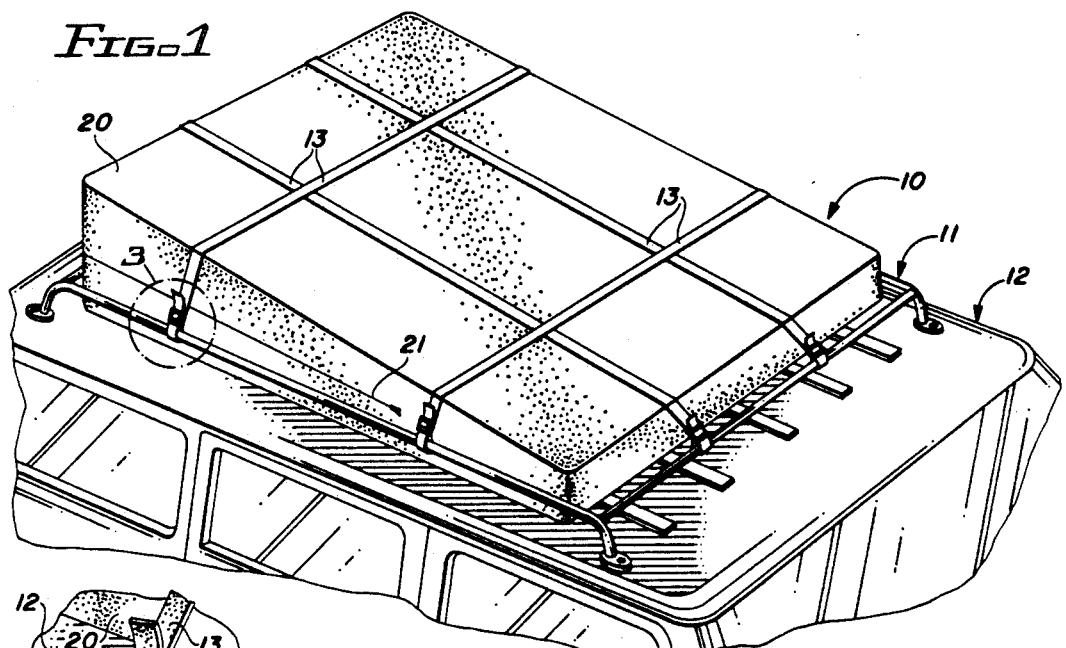
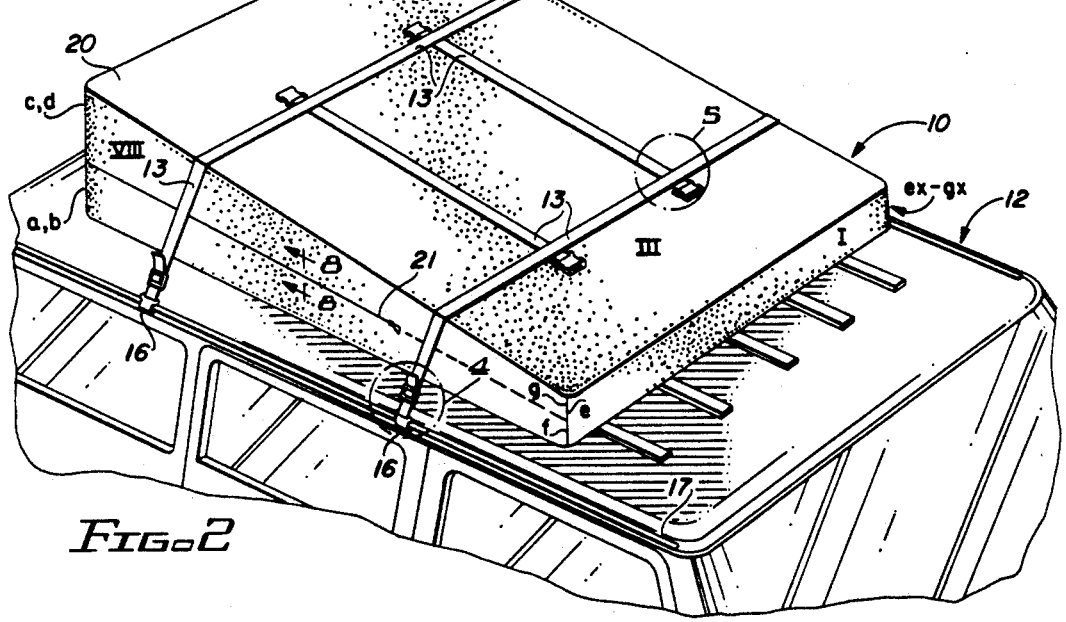

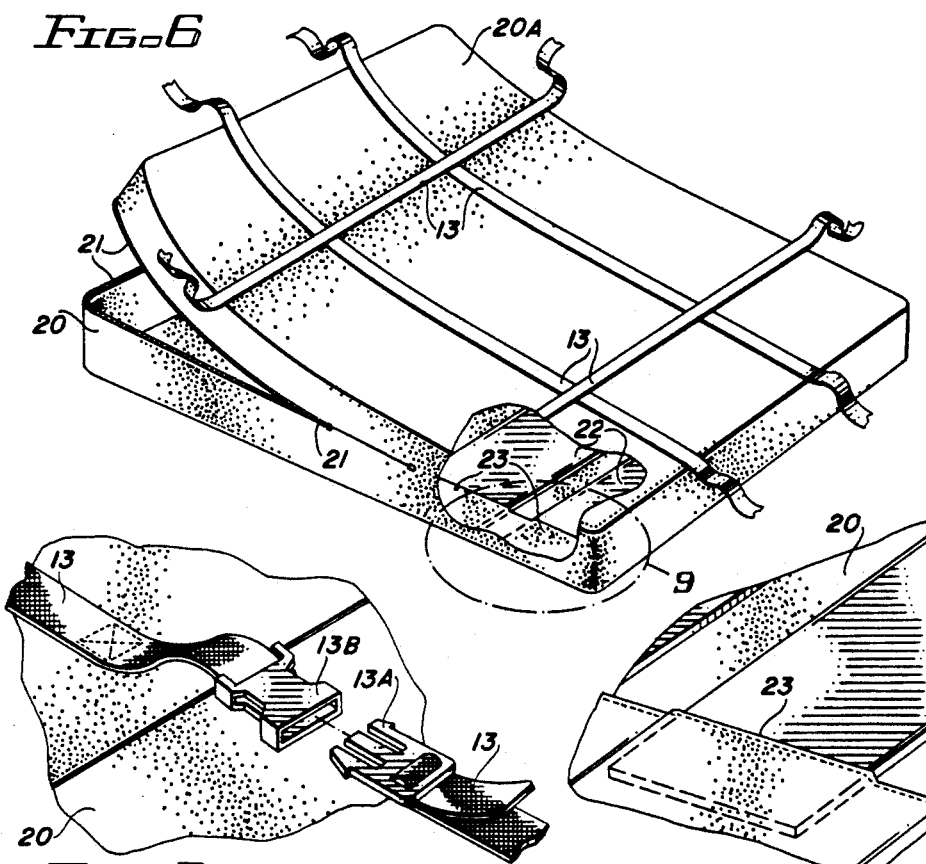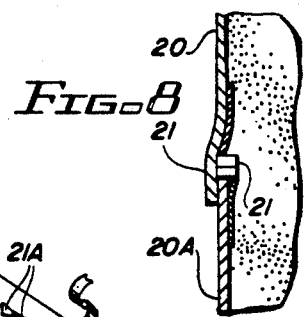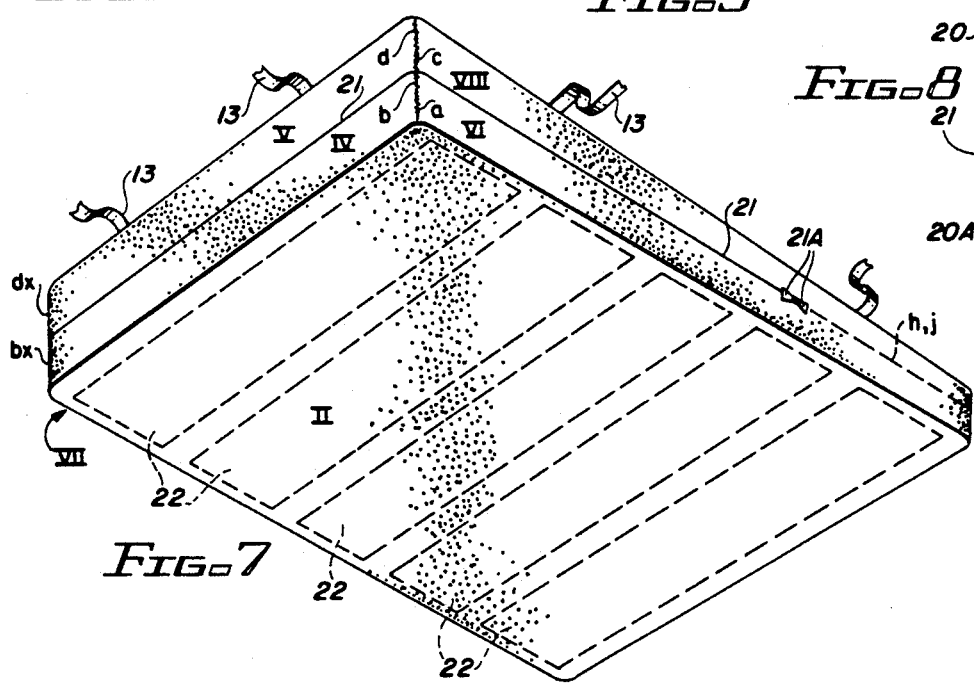

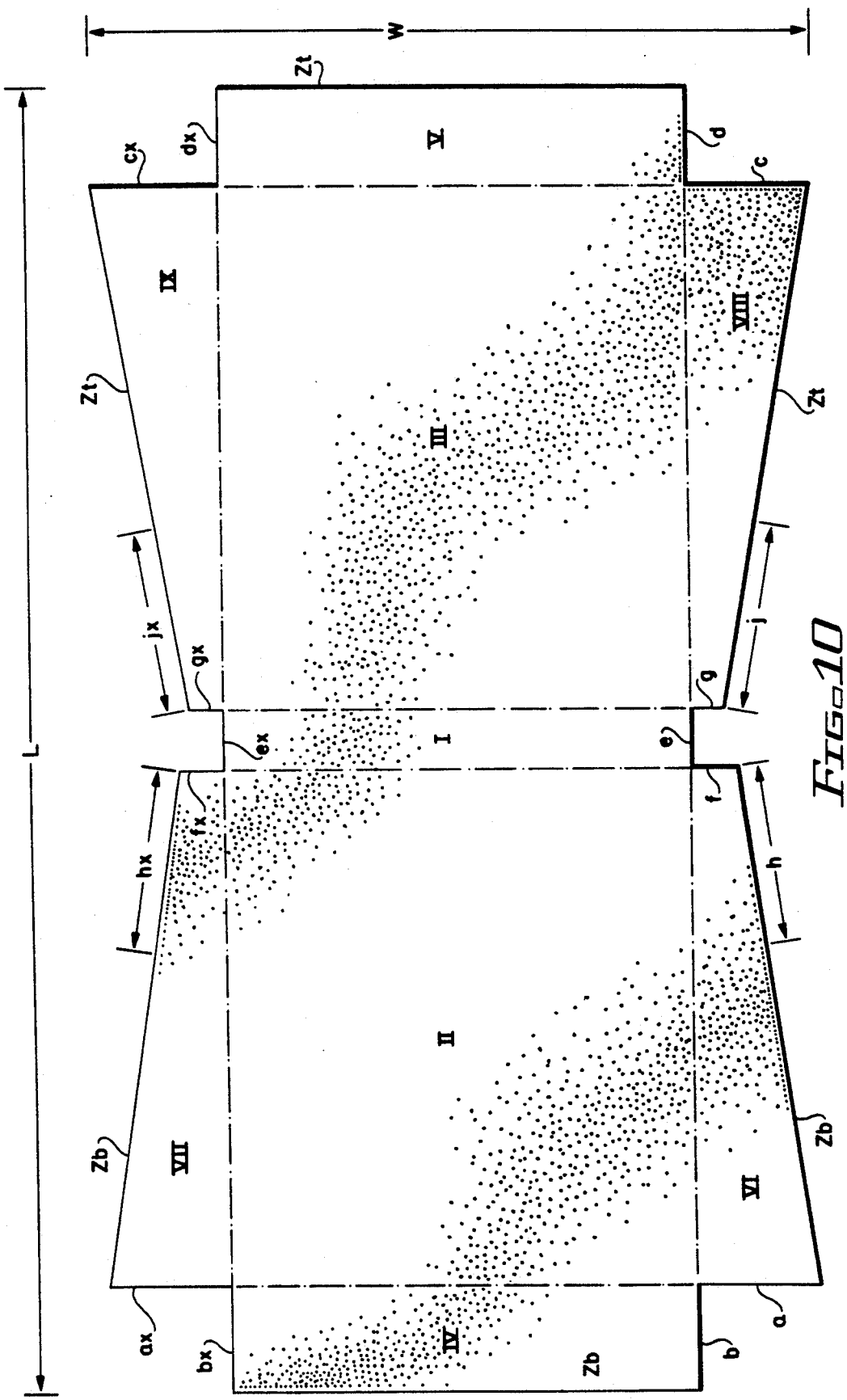

FLEXIBLE, CAR-TOP-TRANSPORTABLE CARRIER FOR AERODYNAMICALLY STREAMLINED CARS

BACKGROUND

1. Field of the Invention

The invention relates to the field of enclosures to carry baggage and the like on top of aerodynamically streamlined automobiles. In particular, the invention relates to a flexible enclosure which may be folded when not in use. Specifically, the invention relates to a flexible enclosure made of the one single piece of material such that the front face of the enclosure as well as the top and bottom of the enclosure present an unseamed surface are to the wind and weather elements while being transported atop aerodynamically streamlined automobile. Aerodynamically streamlined motor vehicles have no rain gutters to which a car top carrier may be attached. Aerodynamically streamlined cars generally require the installation of permanent roof racks in order to permit luggage, luggage enclosures, and the like to be transported atop the roof of the vehicle.

2. Prior Art

Various types of enclosures are available for use on top of an automobile. These enclosure are intended to transport baggage and other goods and materials in a manner which protects them from the wind and weather elements while being so transported. In general, these enclosures are cumbersome affairs. Many are rigid, or semi-rigid and are difficult to manipulate when placing them on or removing them from the automobile. Such enclosures present an additional problem when it comes time to store them conveniently.

Many aerodynamically streamlined automobiles today are equipped with car-top carrying racks on which baggage and other materials may be placed and latched securely. Items transported in this fashion have no protection from wind and weather. Often such items are covered with a tarpaulin to provide some protection. However, the relative movement of the air under, over and about the tarpaulin as the car is driven, usually hinders the ability of the tarpaulin to protect the items. It is a familiar sight to see a vehicle driving down the highway with a plastic or canvas tarp flapping in the breeze.

It is an object of the present invention to provide a car-top carrier transportable atop an aerodynamically streamlined car independent of the presence or absence of a roof-rack carrier on the car.

It is a further object of the present invention to provide a car-top carrier which totally encloses baggage and other goods therein. Thus, the baggage and goods are contained within a total surround to which convenient access is provided. The enclosure is made of flexible material and may be folded to occupy a small amount of space when not in use. The ability to so fold the enclosure facilitates its storage and makes for ease of installation on and removal from an automobile.

It is the specific intent of this disclosure to provide the method whereby such an enclosure may be fabricated from a single piece of material so as to reduce the number of seams introduced in the course of manufacture. The top, front, and bottom surfaces of the enclosure produced by the method set forth herein will be seam free.

SUMMARY OF THE INVENTION

The invention is a flexible, car-top-transportable baggage carrier. It is formed of the combination which includes an aerodynamically streamlined car. The car is free of rain gutter protrubances. It has has a roof, a door, and an interior head liner adjacent the top of the door. There is a baggage enclosure made of flexible material to which a strap is attached for coupling the enclosure to the roof of the aerodynamically streamlined car. The strap has a distal end with means coupled to the distal end of the strap for coupling the strap to the interior head liner of the aerodynamically streamlined car adjacent the top of the door. This coupling maintains the enclosure on the roof of the car. The means coupled to the distal end of the strap comprises attachment means for removable coupling to the interior head liner of the car. The attachment means, in turn, comprises a hooked end for engaging the door head liner; and, a body above the hooked end configured to be generally non-interfering positioned between the top of the car door and the door head liner when the hooked end is engaging the door head liner and the car door is closed.

The carrier is claimed as an enclosure produced by a specific process to yield a flexible car-top-transportable baggage enclosure. To minimize material waste, the single piece pattern of the enclosure spans the full width of a commercially available bolt of material. Material of the type such as used with backpacks is presently preferred. Nine distinct regions are laid out on a selected length of the material. These regions define the unseamed front surface as well as the unseamed top and bottom surfaces of the enclosure to be fabricated. Peripheral to these three defined regions are regions which define the upper and lower parts of the left and right sides of the enclosure as well as the upper and lower parts of the rear face of the enclosure. These peripheral regions are joined so as to form the enclosure. A portion of that joining of these regions utilizes a zipper to provide ready access to the interior of the enclosure. A part of the material acts as a weather shield over the zipper.

To distribute the weight load of the goods carried within the enclosure while it is atop an automobile, load bearing platens are coupled to the interior bottom surface of the enclosure. These platens, part of a load bearing floormat, are made up of a plurality of strips laid across the width of the enclosure. The floormat and the enclosure can be accordion folded for storage yet they provide the necessary weight distribution effect when the enclosure is mounted on top of an automobile roof.

At its simplest, the invention is a flexible, car-top-transportable baggage enclosure for use on aerodynamically streamlined cars which have no exterior rain gutters. The enclosure comprises a baggage enclosure made of flexible material. There is a strap coupled to the enclosure for coupling the enclosure to the roof of a vehicle. A door head liner hook is coupled to a distal end of the strap for coupling to the interior door head liner of the vehicle adjacent the top of a door of the vehicle.

DESCRIPTION OF THE DRAWINGS

FIG. 1 is a perspective view of the prior art whereby a car-top carrier is coupled to an existing baggage rack on top of an aerodynamically streamlined automobile.

FIG. 2 is similar to FIG. 1 except that the enclosure is that of the invention and is coupled to the car's interior adjacent the top edge of the doors of the aerodynamic automobile.

FIG. 3 is a detail illustrating the prior art manner in which the strapping on the enclosure is coupled to the side rails of an existing baggage rack.

FIG. 5 illustrates the use of a quick disconnect for releasedly coupling a distal length of strapping to the enclosure.

FIG. 6 illustrates the manner in which the enclosure is opened when the zipper segments are uncoupled. A partial view of the interior indicates the placement of a load bearing, accordion fold, platen reinforced floor pad within the enclosure.

FIG. 7 is a bottom perspective view of the enclosure indicating, in phantom outline, the placement of the load bearing, accordion fold, platen reinforced floor pad within the enclosure.

FIG. 8 illustrates the manner in which a portion of the material of the enclosure is provided as a weather shield for the zipper fastener.

FIG. 9 is a detail of the load bearing platens encased within a thermally welded, vinyl coated, covering material. The material may be folded, accordion fashion, between platens.

FIG. 10 is a pattern identifying the various regions of the pattern which will form selected surfaces of the enclosure. Edges of a material which will be joined are indicated by letters.

DETAILED DESCRIPTION OF THE INVENTION

Figure 4:
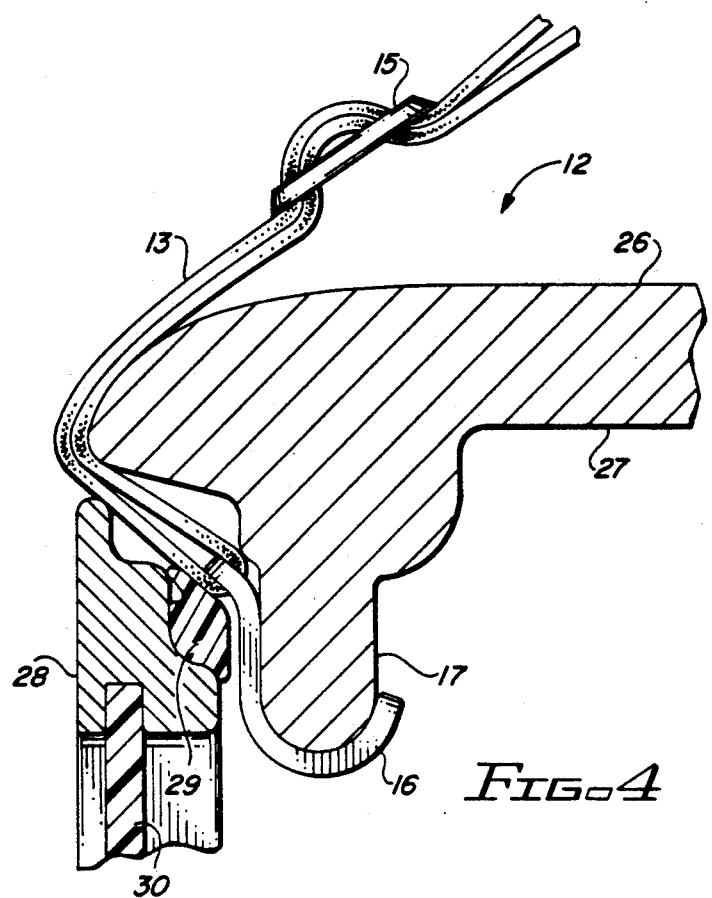
FIG. 4 is a cross-sectional detail of the manner in which the strapping of the enclosure is coupled to the interior of the car adjacent the top edge of a door of the aerodynamic automobile.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

A car-top baggage carrier 10 is illustrated in perspective in FIG. 1. Carrier 10 is comprised of an enclosure 20 which is mounted on the roof of a car 12. As is typical with prior art installations on aerodynamically streamlined vehicles, car 12 is equipped with a baggage rack 11 and enclosure 20 is secured to baggage rack rail 11 by means of straps 13. FIG. 3 shows a detail of the manner in which straps 13 are coupled to rack rail 11. A loop 14 of strap 13 is passed about rail 11 and a buckle 15 is utilized to maintain strap 13 looped about rail 11 of the car-top rack.

FIG. 2 is a perspective drawing illustrating the emplacement of enclosure 20 on an aerodynamically streamlined car which does not have a baggage rack. In FIG. 2, it is clear that car 12 has no rain gutters running along the side lengths of the roof as are typical of non-aerodynamic cars of the prior art. Clips 16, not seen in FIG. 2, are coupled to belts 13, to secure enclosure 20 to the interior of car 12. FIG. 4 shows a cross sectional detail of the manner in which belt 13 is adjustably coupled to interior header hook 16 which in turn is coupled to door head liner 17.

In FIG. 4, the cross-sectional view taken from in front of belt 13 in the region indicated as IV in FIG. 2 includes a portion of the roof 26 of that vehicle. Roof 26, as illustrated, curves smoothly downward to the left of the drawing. There are no roof gutter protuberances below roof 26 is the ceiling 27 at the interior of vehicle 12. To the left of ceiling 27, in the illustration, is the door head liner 17 which joins with ceiling 27 and which provides a door ceiling barrier between the interior of vehicle 12 and door 28.

Door 28, which normally carries a window 30, includes a weather strip gasket which forms a weather seal between door head liner 17 and door 28.

To fasten enclosure 20 on the roof 26 of vehicle 12, door 28 is opened and interior header hook 16, attached to straps 13, is removably fastened to door head liner 17 in the manner shown in FIG. 4. Straps 13 are then tightened by adjustment of the straps and buckles 15. Thereafter door 28 is closed. The resulting configuration is that shown in FIG. 4.

It is noted that interior header hook 16 is configured to provide a generally non-interfering fit when it is positioned between door head liner 17 and door 28. The one exception to this statement is that weather strip gasket 29, which is freely distortable, will conform itself about the upper end of hook 16 where it is coupled to straps 13 such that door 28 may be freely closed.

It should be noted that FIG. 4 is an artist's conception of the manner in which the various elements are configured upon closure of door 28. Despite the represented distortion of weather strip gasket 29, no leakage through the door seals of an aerodynamically streamlined car carrying the roof top enclosure disclosed herein and fastened in the manner illustrated in FIG. 4, have been noted.

Figure 4A:
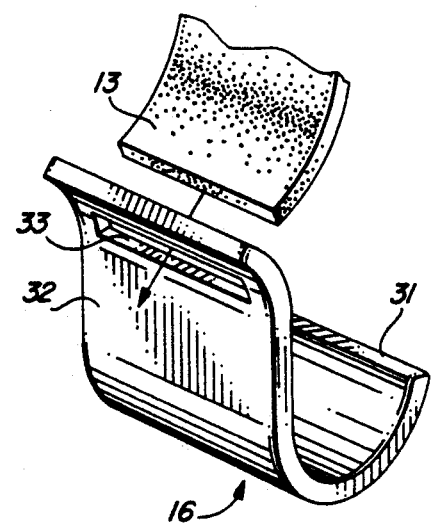
FIG. 4A is a perspective view of the strap hood which is configured for interior coupling adjacent the top edge of the door of an aerodynamic car.

Interior head hook 16 is shown in greater detail in FIG. 4A. Hook 16 is comprised of a hook-shaped section 31 which is sized and shaped for engagement with door head liner 17. The hook-shaped section 31 is joined to a body or riser 32 which is shaped to obviate any interference between door 28 and door head liner 17 when door 28 is closed. See FIG. 4. At the top of riser 32 is a slot 33 which accepts the distal end of strap 13. Strap 13 passes through slot 33 and is drawn upward through buckle 15 as illustrated in FIG. 4.

Since vehicle 12 is an aerodynamically streamlined vehicle, there is no roof gutter protruding from the edge of the roof above the doors of the vehicle. It was to this protruding rain gutter which prior art, roof-top-baggage carriers were coupled in order to maintain the carrier in position on the roof of the vehicle. With the arrival of the aerodynamically streamlined car, car manufacturers, and those who provide after-market equipment for these vehicles, have resorted to the attachment of roof racks in order to provide a purchase for maintaining a baggage carrier in position on the roof. The innovative interior header hook 16 which couples to the door head liner 17 interior of the top edge of door 28 permits the owner of such a streamlined vehicle to attach and maintain a flexible baggage carrier to the roof top of his vehicle without having to resort to a baggage rack affixed to the roof.

In both of the illustrations of FIGS. 1 and 2, enclosure 20 is secured as a complete surround over any items that may be contained within enclosure 20. Zipper 21 provides the means whereby access is gained to the interior of enclosure 20. The illustration of FIG. 6 shows the actuation of zipper 21 to provide access to enclosure 20.

In certain instances it may be desirable to shorten the length of straps 13. An instance of this is illustrated in FIG. 2 wherein the pair of straps 13 running fore and aft on enclosure 20 have been shortened. A detail 5, shown in FIG. 5, illustrates the use of a quick disconnect strap coupling assembly 13A and 13B which permits the rapid removal of the distal ends of straps 13 from carrier 10 when desired. The quick disconnect assembly 13A and 13B is comprised of a lockable insert 13A which is compressed as it enters into buckle clamp 13B and thereafter expands into locking configuration therein. Any or all of straps 13 may be removably coupled to carrier 10 in the manner illustrating the detail of FIG. 5.

FIG. 6 includes a partial sectional view revealing the interior of enclosure 20 and the placement of a load bearing, accordion fold, platen reinforced floor pad 23 therein. The platens 22 are maintained in position within floor pad 23 by thermal welds. In FIG. 9, a detail drawing shows a platen 22 encompassed within, for example, a vinyl coated material 24 and maintained in position by, for example, thermal welds 25. Platens 22 distribute the load over a wide surface of the roof of a vehicle 12 so as to prevent deforming or denting the roof of vehicle 12. Because a plurality of platens 22 are emplaced within floor pad 23 which, in turn, is emplaced within enclosure 20, enclosure 20 may be folded, accordion fashion, so as to occupy a minimal amount of space when stored. The bottom view of enclosure 20 shown in FIG. 7 illustrates in phantom outline the placement of floor pad 23 with its platens 22 within enclosure 20.

Ideally, platens 22 comprise a rugged but lightweight material useful in distributing the load carried within an enclosure 20. Many materials suggest themselves; for example, aluminum or plastic sheeting. However, for reasons of practicality and economy, the preferred material suggested for use as platen 22 is the thin wood veneer utilized to cover hollow-core doors. This veneer, known generically as a "door skin," is inexpensive, and is sufficiently rugged to perform the load bearing function.

It is the intent of the invention to provide a flexible but very weather tight enclosure fabricated by the process taught herein. Because of the possibility of leakage at or along zipper 21, a portion 20A of enclosure 20 is designed to extend downward so as to provide a weather shield over zipper 21. This arrangement is illustrated in FIG. 8.

To further facilitate the utility of enclosure 20, zipper 21 is shown provided with 2 slides, 21A in FIG. 7. As those skilled in the art will recognize, the use of 2 slides 21A permits the user to determine where along the length of zipper 21 the initial opening may be made.

In disclosing a weather tight, flexible enclosure fabricated of a single piece of material in accord with a prescribed methodology, the pattern drawing of FIG. 10 should be referred to with additional reference being made to FIGS. 2 and 7 wherein certain portions of the pattern of FIG. 10 are identified.

FIG. 10 illustrates a pattern used in fabricating an enclosure 20. The pattern is laid out on material of length L and width W. For purposes of economy, it is desirable that the width of the bolt of material to be used in fabricating an enclosure 20 be the same as the width W of the pattern as illustrated in FIG. 10

The material selected should be a durable, waterproof, light weight material that is easily cleaned and which will stand up well under exposure to the ultraviolet radiation contained in sunlight. Optionally, the material may be made available in a variety of colors so that enclosures 20, appealing to the variety of persons' color senses, may be fabricated. Such materials as described are presently used in the fabrication of backpacks and soft luggage. Conveniently, this material is commercially available in bolt widths of 60 inches which is one of the optimal sizes for the pattern illustrated in FIG. 10.

In deriving a pattern for enclosure 20, one first considers the width of the car roof on which the carrier will be used, the height of the front face, the length of the base of the enclosure and the height of the rear face. To provide for an improved aerodynamic interface between carrier 20 and the air through which it moves as the vehicle carries it along, the illustrations of FIGS. 1, 2, 6 and 7 indicate that the foremost or front face of the enclosure is of a lower height than the rear face.

The drawing of FIG. 10 is not a scaled drawing but is representative of the pattern required to produce a cartop transportable carrier such as enclosure 20 illustrated in the drawings here. Centrally located is a first region referenced as Roman Numeral I. Region I, generally rectangular in shape, defines the front face of the enclosure to be fabricated. Its length extends in the direction of the width W and its width defines the height of the front face of the fabricated enclosure.

To the left of Region I, is Region II. Region II is again generally rectangular in shape and defines the bottom of the enclosure.

To the right of Region I is Region III, another generally rectangular region, which defines the top of the enclosure. Regions I, II and III are delineated by dash-dot lines. These dash-dot lines define lines along which the fabric of which the enclosure is made will be folded.

Immediately to the left of Region II, another generally rectangular region, Region IV, defines the lower portion of the rear face of the enclosure. So too, Region V, immediately to the right of Region III, defines the upper portion of the rear face of the enclosure. The side faces of the enclosure are defined by the projections above and below Regions II and III.

Region VI, immediately below Region II, has the shape of a truncated triangle. Since Region VI defines the lower portion of the right side of the enclosure, the truncated triangular shape of Region VI will cause the resultant enclosure to taper downward from a first selected height at the rear of the enclosure to a lower height at the front of the enclosure.

Immediately above Region II another truncated triangular shape, Region VII, defines the lower left side panel of the enclosure. Similarly, Region VIII, a truncated triangular shaped region immediately below Region III, defines the upper right side panel of the enclosure while Region IX immediately above Region III, and also a truncated triangular shape, defines the upper left hand side panel of the enclosure.

It should be noted that the length L determined by Regions IV, II, I, III, and V, respectively, represents a length of material which is continuous and unbroken by sewn seams. Thus, the front face, Region I, the bottom, Region II, and the top, Region III, of the resulting enclosure will not be subjected to leakage as the enclosure is advanced through wind and weather elements in its transport atop a vehicle. To assemble the enclosure from the pattern represented by FIG. 10, the material is folded along the dash-dot lines. At the right side of the enclosure, side a is stitched to side b; sides f and g are stitched to side e; and side d is stitched to side c. Similarly, on the left side of the enclosure, side ax, is sewn to side bx; sides fx and gx are sewn to side ex; and side cx is sewn to side dx. The resultant drawing of these sides is indicated by references set out in FIGS. 2 and 7 wherein various ones of Regions I through IX are indicated as well as certain of the joined pattern sides.

At this point in the fabrication of enclosure 20, a fabric structure having three open sides has been derived. The open sides remain because the common edge Zt of the upper side panels and the upper rear face, Regions VIII, IX, and V, respectively, have not been joined in any way to the common upper edge Zb of the lower side panels and the lower rear panel, Regions VI, VII and Region IV, respectively.

The edges Zt and Zb may be releasably coupled by means of a zipper 21. However, for ease of utilizing enclosure 20, it has been found desirable to permanently join a portion of edges Zt to a portion of edges Zb. Thus, a length h at the edge Zb of Region VI is sewn to a length j of edge Zt of Region VIII. Similarly, a length hx of edge Zb of Region VII is sewn to the length jx of edge Zt of Region IX. The remaining portions of edges Zb and Zt are releasably coupled by means of zipper 21.

While the fabrication of enclosure 20 has been set forth as a sewn assembly, no limitation on the manner of assembly is implied. Adhesives may well be used to good advantage.

What has been described is a car-top-transportable baggage carrier particularly suited for use on aerodynamically streamlined cars which have no rain gutters. The carrier is made from a single continuous piece of material so that no seams or joinings in the material are produced in the face of the enclosure or the top and bottom surfaces. Weight distribution paneling within a load bearing floor pad inserted at the bottom of the carrier serve to distribute the weight of articles emplaced within the carrier, yet permit the carrier to be accordion folded for storage when not in use. Straps affixed to the top of the carrier are employed to secure the carrier in position on top of an automobile. The straps are equipped with innovative door head liner hooks which secure the carrier to the interior of the automobile adjacent the top of the car door. Releasable couplings permit rapid removal and replacement of the distal ends of the strapping as desired.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, That which is claimed is:

1. A flexible, car-top-transportable baggage carrier, comprising in combination:

an aerodynamically streamlined car, free of rain gutter protuberances, having a roof, a door, and an interior head liner adjacent the top of said door;

a baggage enclosure made of flexible material a strap coupled to said enclosure for coupling said enclosure to said roof of said aerodynamically streamlined car, said strap having a distal end;

means coupled to said distal end of said strap for coupling said strap to said interior head liner of said aerodynamically streamlined car adjacent said top of said door for maintaining said enclosure on said roof of said car;

said baggage enclosure being made using a single length of material by the process comprising the steps of:

selecting a length of flexible material having a width W;

designating a first region, centered on said selected length of material, defining a front face of said enclosure, said front face being generally rectangular in shape, having two longer sides lying perpendicular to said selected length of material, and being shorter in length than the width W of said material;

designating a second region having a side as long as and adjacent to a first of said longer sides of said rectangular shaped front face and defining a bottom of said enclosure and being generally rectangular in shape;

designating a third region having a side as long as and adjacent to a second of said longer sides of said rectangular shaped front face and defining atop of said enclosure and being generally rectangular in shape;

designating a fourth generally rectangular shaped region having two longer sides parallel to said two longer sides of said face and extending from said bottom along said selected length of material and defining a lower parts of a rear face of said enclosure;

designating a fifth generally rectangular shaped region having two longer sides parallel to said two longer sides of said face and extending from said top along said selected length of material and defining an upper part of said rear face of said enclosure;

designating a sixth and a seventh region positioned one along each of the remaining opposed sides of said bottom and extending outward from said bottom along said width W of said selected length of material, said sixth region defining a lower right side of said enclosure and said seventh region defining a lower left side of said enclosure;

designating an eight and a ninth region positioned one along each of the remaining opposed sides of said top and extending outward from said top along said width W of said selected length of material, said eight region defining an upper right side of said enclosure and said ninth region defining an upper left side of said enclosure; and joining adjacent exterior edges of said regions to form said car-top-transportable baggage enclosure.

2. The baggage carrier of claim 1 wherein said means coupled to said distal end of said strap comprises attachment means for removable coupling to said interior head liner of said car.

3. The baggage carrier of claim 2 wherein said attachment means comprises:

a hooked end for engaging said door head liner; and a body above said hooked end configured to be generally non-interfering positioned between is top of said car door and said door head liner when said hooked end is engaging said door head liner and said car door is closed.

4. The baggage carrier of claim 1 wherein the process step of joining adjacent exterior edges of said regions includes the step of releasably joining selected ones of those regions forming upper and lower parts of said enclosure.

5. The baggage carrier of claim 4 wherein said process step of releasably joining selected ones of those regions comprises the step of joining said regions by means of a zipper fastener.

6. The baggage carrier of claim 1 wherein the process steps of designating said sixth, seventh, eighth and ninth regions includes the steps of defining said regions in the shape of truncated triangles and the enclosure formed by the step of joining adjacent exterior sides of said regions forms and enclosure having a front face height less than its rear face height.

7. The baggage carrier of claim 6 wherein the process step of joining adjacent exterior edges of said regions includes the step of releasably joining selected ones of those regions forming upper and lower parts of said enclosure.

8. The baggage carrier of claim 7 wherein said process step of releasably joining selected ones of those regions comprises the step of joining said regions by means of a zipper fastener.

9. The baggage carrier of claim 1 further comprising the process step of:
coupling a plurality of load bearing platens to said bottom of said enclosure for distributing the weight load of materials carried in said enclosure.

10. The baggage carrier of claim 9 wherein said process step of coupling said platens to said bottom includes the step of coupling said platens so as to permit said bottom to be accordion-folded to facilitate storage of said enclosure.

11. The baggage carrier of claim 10 wherein the process steps of designating said sixth, seventh, eighth and ninth regions includes the steps of defining said regions in the shape of truncated triangles and the enclosure formed by the step of joining adjacent exterior sides of said regions forms an enclosure having a front face height less than its rear face height.

12. The baggage carrier of claim 9 wherein the process step of joining adjacent exterior edges of said regions includes the step of releasably joining selected ones of those regions forming upper and lower parts of said enclosure.

13. The baggage carrier of claim 12 wherein said process step of releasably joining selected ones of those regions comprises the step of joining said regions by means of a zipper fastener.

14. The baggage carrier of claim 1 further comprising the process step of releasably coupling said distal end of said strap to said enclosure.

* * * * *